US012022763B2

(12) United States Patent
Dillon

(10) Patent No.: US 12,022,763 B2
(45) Date of Patent: Jul. 2, 2024

(54) CHEST-MOUNTED SPREADER

(71) Applicant: Chapin Manufacturing, Inc., Batavia, NY (US)

(72) Inventor: James V. Dillon, Batavia, NY (US)

(73) Assignee: CHAPIN MANUFACTURING, INC., Batavia, NY (US)

( * ) Notice: Subject to any disclaimer, the term of this patent is extended or adjusted under 35 U.S.C. 154(b) by 587 days.

(21) Appl. No.: 17/194,854

(22) Filed: Mar. 8, 2021

(65) Prior Publication Data

US 2022/0279708 A1     Sep. 8, 2022

(51) Int. Cl.
*A01C 17/00*      (2006.01)
*A01C 15/00*      (2006.01)

(52) U.S. Cl.
CPC .......... *A01C 17/005* (2013.01); *A01C 15/007* (2013.01); *A01C 17/001* (2013.01)

(58) Field of Classification Search
CPC ....... A01C 15/02; A01C 15/06; A01C 15/007; A01C 17/001; A01C 17/005
USPC .................................. 239/653, 681, 687, 689
See application file for complete search history.

(56) References Cited

U.S. PATENT DOCUMENTS

| 1,166,476 A * | 1/1916 | Parrish | A01C 7/02 239/653 |
| 3,993,225 A * | 11/1976 | Manni | A01C 15/02 239/653 |
| 5,944,264 A * | 8/1999 | Truax | A01C 7/02 239/653 |
| 8,066,206 B1 * | 11/2011 | Cotham | A01K 5/0225 239/653 |
| 2006/0016918 A1 * | 1/2006 | Sagol | E01C 19/203 239/681 |
| 2015/0136870 A1 * | 5/2015 | Myers | A01C 17/001 239/653 |

* cited by examiner

*Primary Examiner* — Steven J Ganey
(74) *Attorney, Agent, or Firm* — Woods Oviatt Gilman LLP; Katherine H. McGuire, Esq.

(57) ABSTRACT

A chest-mounted spreader system includes a hopper for receiving particulate material and a base assembly mounted to the hopper. The base assembly has a base unit having a base plate and rotatable shaft. An electric motor is coupled to the shaft to drive rotation of the shaft. An impeller is mounted on the shaft proximate the base plate. A shroud has a partial sidewall affixed to the base plate thereby defining an impeller cavity. The impeller cavity includes a discharge opening opposite the partial sidewall and the impeller is received within the impeller cavity. A shroud opening is in fluid communication with the hopper so that particulate matter passes from the hopper to the impeller. The electric motor is powered to rotate the shaft and the impeller to disperse the particulate matter through the discharge opening.

10 Claims, 8 Drawing Sheets

CHEST-MOUNTED SPREADER

FIELD OF THE INVENTION

The present invention generally relates to spreader systems, and more particularly to a broadcast particulate spreader system, and still more particularly to a chest-mounted broadcast particulate spreader system.

BACKGROUND OF THE INVENTION

Spreaders, such as broadcast spreaders are used across an array of applications, including farms, golf courses and residential properties, to apply particulate, such as grass seed, fertilizers, snow and ice salt/sand and the like. These spreaders may be needed to cover a large area. To apply particulate material to these large areas, broadcast spreaders generally include a hopper, impeller, shaft and two wheels supported by an axle. The hopper holds a large volume of material which is funneled to an outlet such that the material may fall onto the impeller. A gear assembly is mounted on the axle between the wheels whereby rotation of the axle along a horizontal axis is translated to rotation of the shaft along a vertical axis. The impeller is mounted on the shaft such that rotation of the shaft causes rotation of the impeller such that the impeller may then cast the particulate material across the coverage area. Locomotion of the spreader may be manual, such through use of a push bar, or mechanical, such as through mounting the spreader to a tractor, all-terrain vehicle (ATV) or other similar vehicle.

One drawback to these systems, however, is that mechanically driven spreaders can only apply material where the tractor or ATV is permitted to travel. As such, these spreaders may not be suitable for certain residential applications, such as spreading salt along a sidewalk. Manual push spreaders may also be limited in certain applications, such as dispersal of particulate material in confined areas. As locomotion of the push spreader is required for rotation of the impeller and dispersal of material, confined areas present the challenge of insufficient travel distances to drive the impeller and disperse sufficient material.

Thus, there remains a need for a spreader that can broadcast particulate material in areas which are inaccessible by vehicle-driven spreaders or inhospitable to push-style spreader units. The present invention satisfies this as well as other needs.

SUMMARY OF THE INVENTION

In view of the above and in accordance with an aspect of the present invention, a chest-mounted spreader system is configured to disperse particulate matter. The spreader system includes a hopper configured to receive the particulate material therein and defining a hopper outlet and a base assembly adapted to mount the hopper thereon. The base assembly comprises a base unit having a base plate having a top surface, a bottom surface and defining a spindle orifice therethrough. An electric motor is coupled to the bottom surface of the base plate and includes a spindle which passes through the spindle orifice of the base plate. A rotatable shaft has a first end which extends above the base plate and into the hopper when the hopper is mounted on the plate and a second end which engages the spindle. An impeller is mounted on the first end of the shaft and is positioned proximate the top surface of the base plate. A shroud has a top plate defining a shroud opening therein and a partial sidewall. The partial sidewall is affixed to the top surface of the base plate thereby defining an impeller cavity defined by the base plate, the top plate and the partial sidewall. The impeller cavity includes a discharge opening opposite the partial sidewall and the impeller is received within the impeller cavity. The shroud opening is in fluid communication with the hopper outlet whereby the shroud is configured to pass the particulate matter from the hopper to the impeller while the electric motor is powered to thereby rotate the shaft and the impeller to disperse the particulate matter through the discharge opening. A battery is mounted to the base assembly and is electrically coupled to the electric motor. A potentiometer may be electrically coupled inline between the battery and the electric motor. The potentiometer may be selectively adjusted to control power to the electric motor to thereby selectively control speed of rotation of the rotatable shaft.

In a further aspect of the present invention, the base assembly may further include a gate opening located between the hopper outlet and the shroud. The gate opening may be proportioned to overlap the shroud opening and may also define one or more flow restriction orifices. A rotary gate may then be mounted between the gate opening and the shroud opening. The rotary gate defines one or more gate restriction openings therein and is selectively positionable between a fully open position, whereby the gate restriction openings fully coincide with the flow restriction orifices and a fully closed position, whereby the rotary gate fully occludes the flow restriction orifices. The rotary gate may also be selectively positionable in a partially occluded position whereby the gate restriction openings partially overlap with the flow restriction orifices. The rotary gate may further include a gate lever configured to manually selectively control rotation of the rotary gate relative to the gate opening. The gate lever may then include a detent while the shroud defines a plurality of slots. The detent may then be selectively positionable within a respective slot to releasably secure the rotary gate in the fully open position, the fully closed position or the partially occluded position.

In still another aspect of the present invention, the base assembly may further include an adjustable location spreader located between the rotary gate and the shroud. The location spreader may have a sloped bottom plate defining a plate opening proximate the bottom of the slope. At least a portion of the sloped bottom plate including the plate opening may then extend through the shroud opening of the shroud.

In another aspect of the present invention, the first end of the rotatable shaft may extend through a respective shaft bore defined within each of the impeller, the location spreader, the rotary gate and the gate opening wherein a terminal end of the first end of the rotatable shaft terminates above the gate opening. The terminal end of the first end of the rotatable shaft may then include an agitator affixed thereto.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

Corresponding reference characters indicate corresponding parts throughout the several views. The exemplifications set out herein illustrate currently preferred embodiments of the invention, and such exemplifications are not to be construed as limiting the scope of the invention in any manner.

DETAILED DESCRIPTION OF THE PREFERRED EMBODIMENTS

Figure 1:
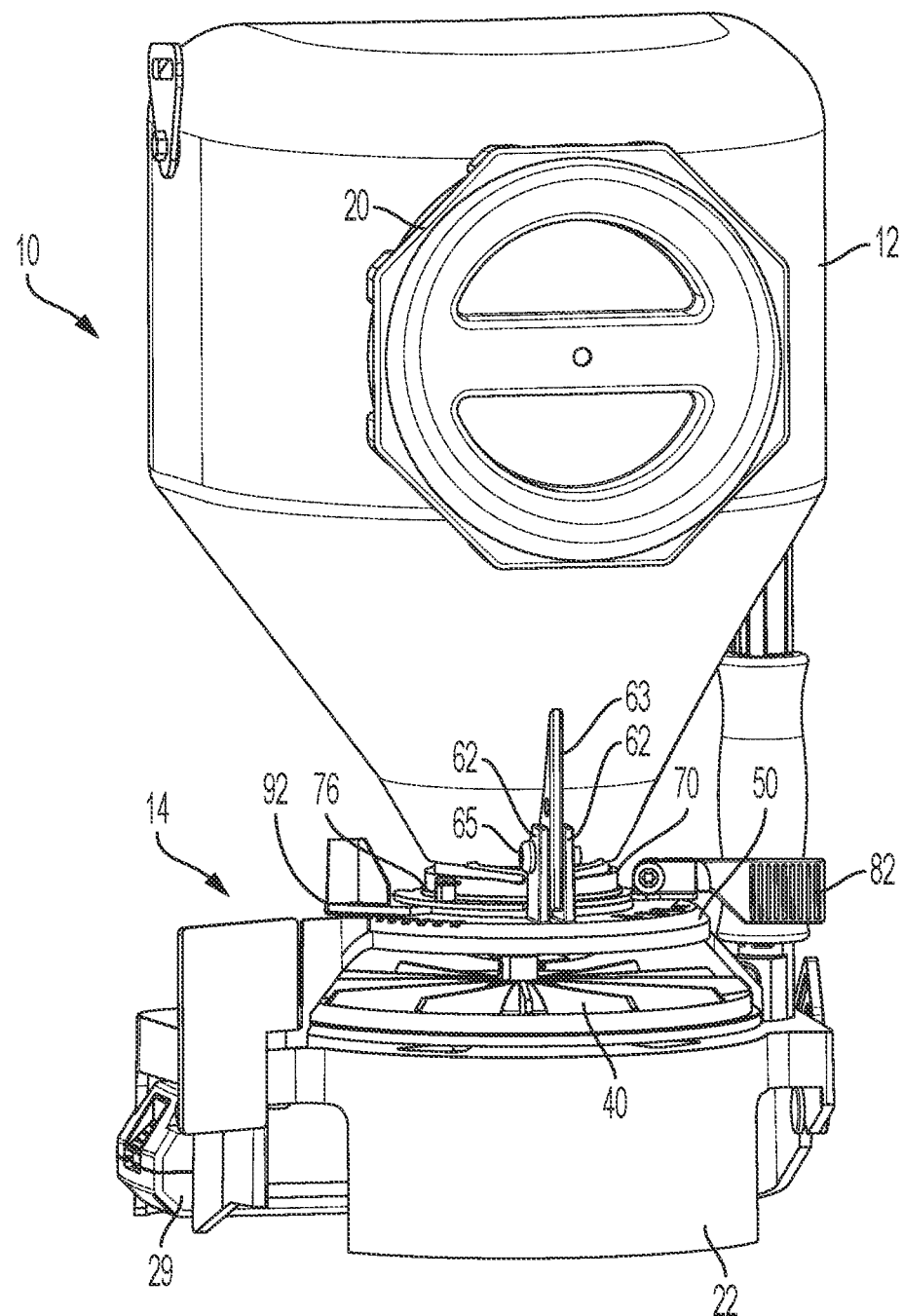
FIG. 1 is a perspective view of an exemplary embodiment of a chest-mounted spreader system in accordance with an aspect of the present invention.
Figure 2:
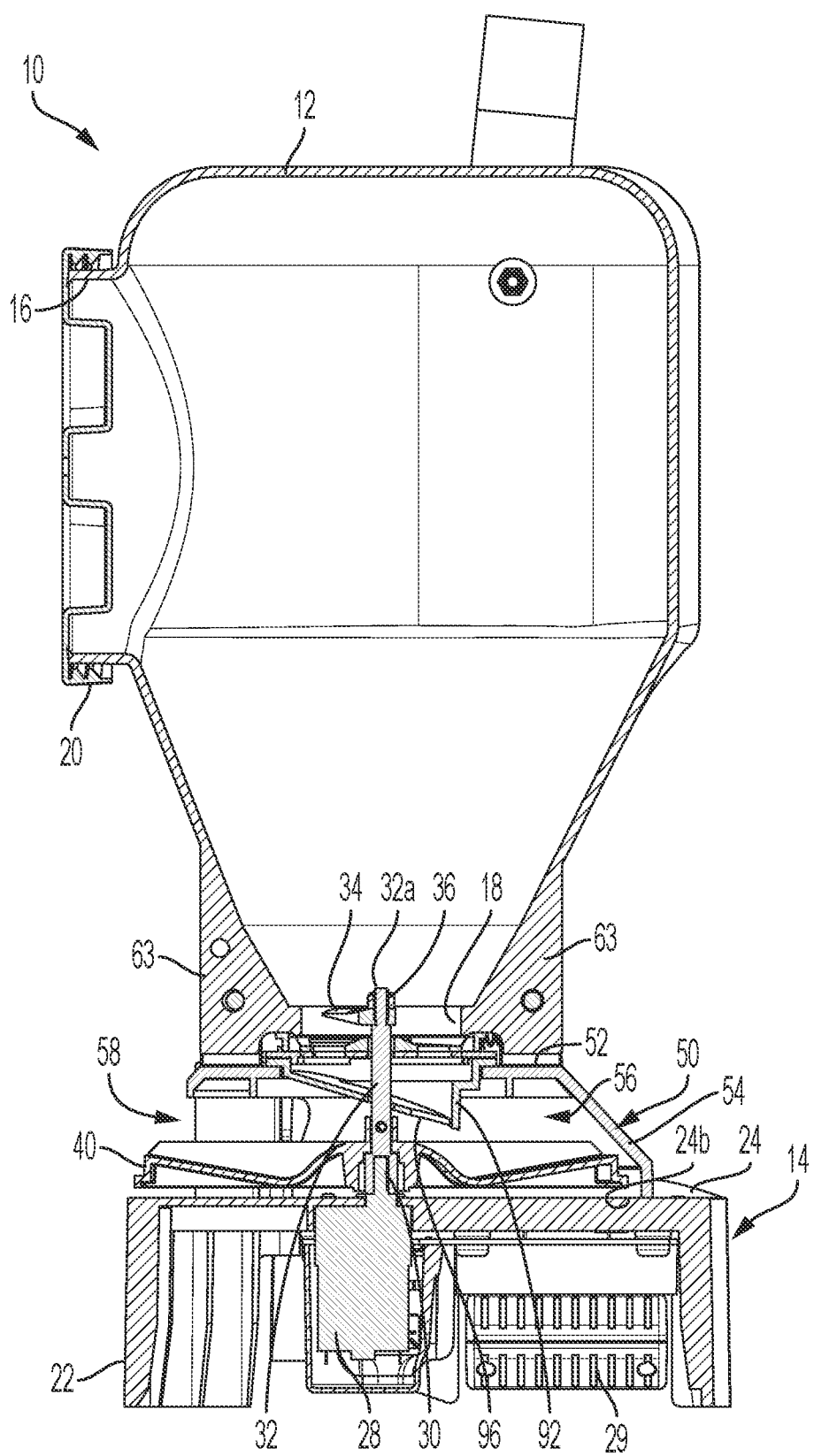
FIG. 2 is a cross section view of the exemplary embodiment of a chest-mounted spreader system shown in FIG. 1.
Figure 3:
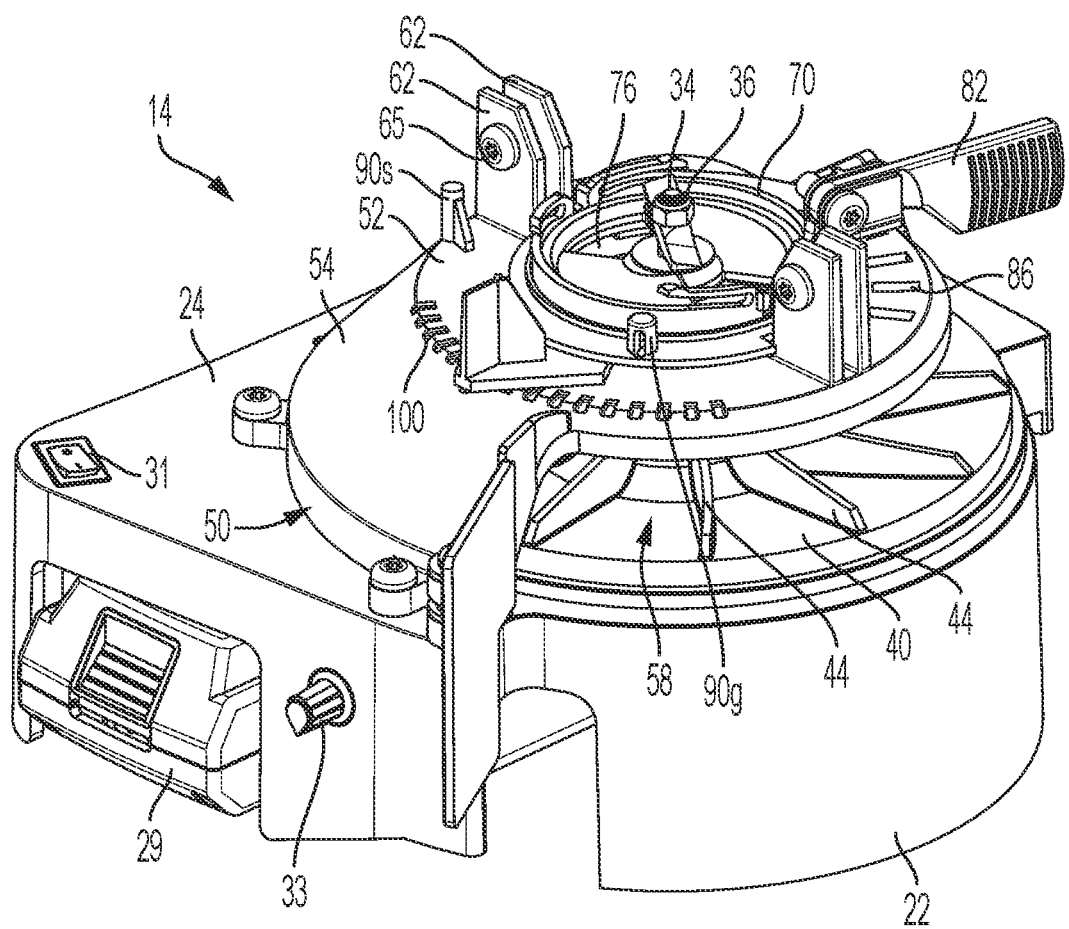
FIG. 3 is a perspective view of an exemplary embodiment of a base assembly for use with the chest-mounted spreader system shown in FIG. 1.
Figure 4:
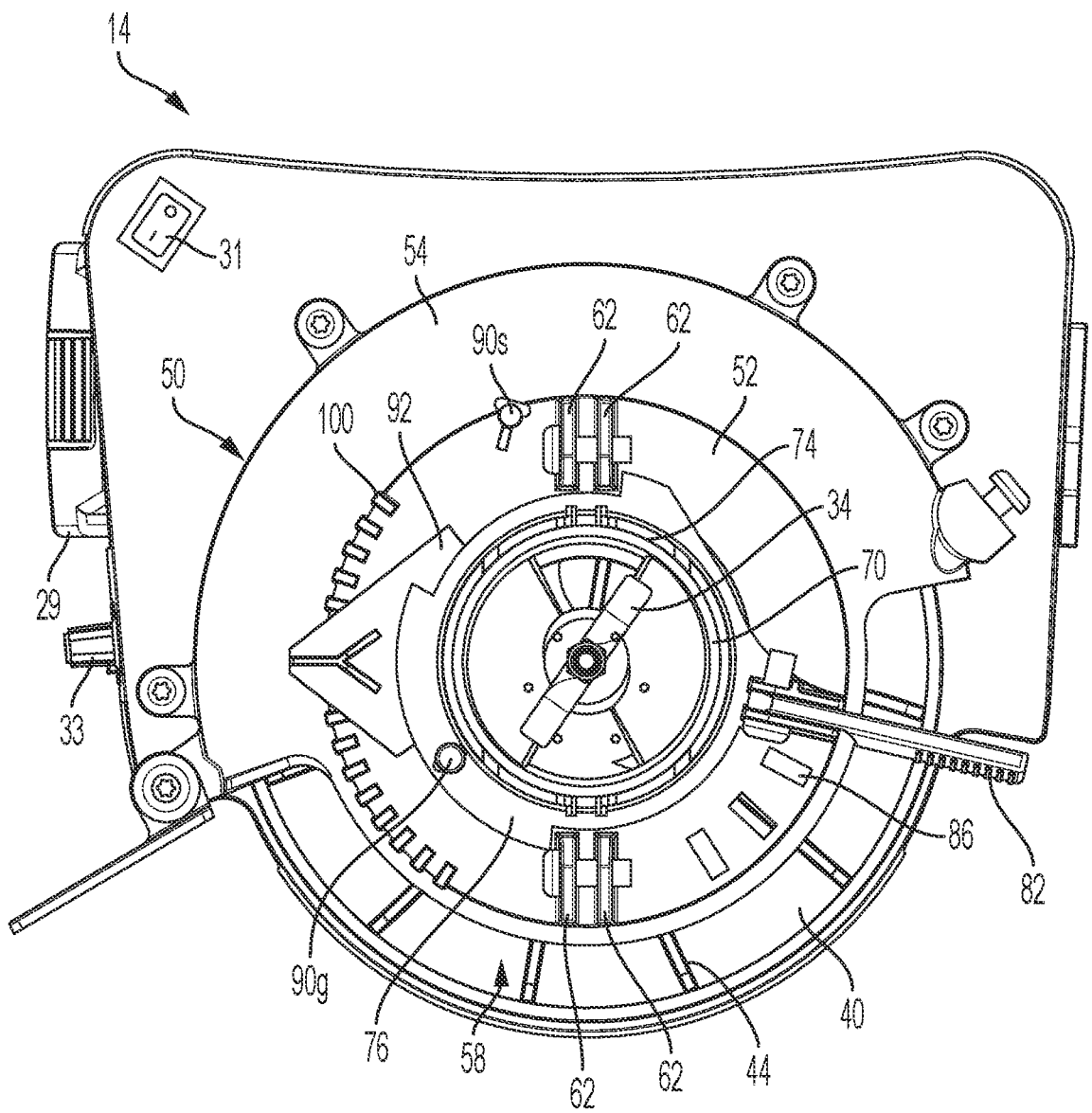
FIG. 4 is a top view of the exemplary embodiment of a base assembly shown in FIG. 3.

Referring now to FIGS. 1 and 2, an exemplary chest-mounted spreader system 10 generally includes a hopper 12 mounted onto a base assembly 14. Hopper 12 defines an open container having a fill port 16 configured to receive particulate matter therethrough, while hopper 12 further includes a hopper outlet 18 through which the particulate matter passes for eventual distribution via spreader system 10, as will be discussed in greater detail below. A replaceable cap 20 covers fill port 16 during use.

Figure 5:
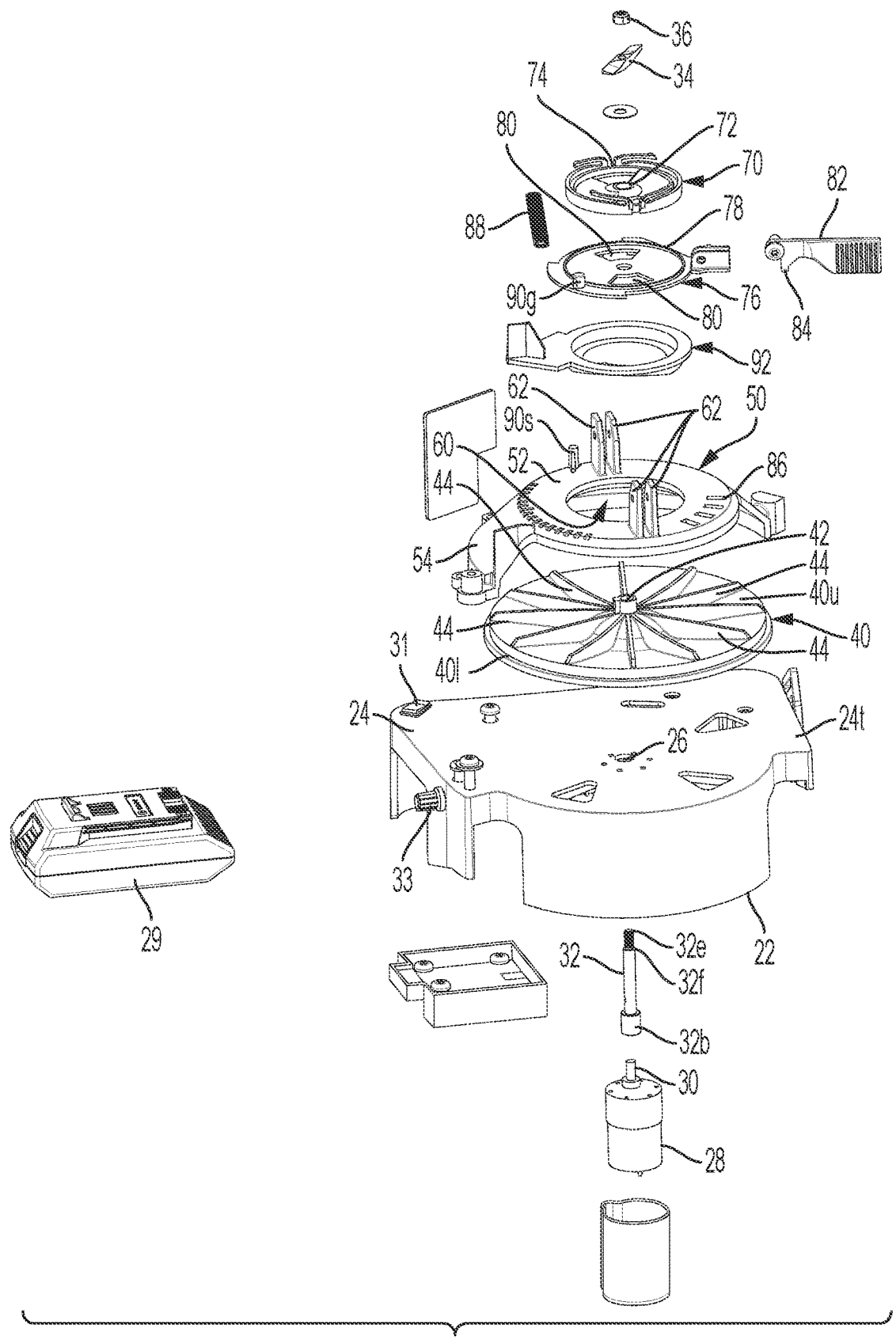
FIG. 5 is an exploded view of the exemplary embodiment of a base assembly shown in FIG. 3.

With additional reference to FIGS. 3-8, with particular attention directed to FIG. 5, base assembly 14 includes a base unit 22 having a base plate 24 defining a spindle orifice 26 therethrough. An electric motor 28 is disposed beneath base plate 24 such that spindle 30 passes from bottom surface 24b through spindle orifice 26 to extend above top surface 24t of base plate 24. Rotatable shaft 32 may then be mounted to motor 28 with motor 28 receiving electrical power from a battery 29. Switch 31 may toggle or slide between ON and OFF positions such that battery power to motor 28 is accessible only when switch 31 is in the ON position. In a further aspect of the invention, a speed control dial 33. may also be included so as to regulate voltage provided to motor 28 such that the speed of rotation of rotatable shaft may be selectively regulated by the user.

With particular reference to FIG. 2, first end 32f of shaft 32 extends upwardly from top surface 24t and is dimensioned so as to have its terminal end 32e reside within hopper 12, preferably proximate hopper outlet 18, when hopper 12 is mounted onto base unit 22. An agitator 34 may then be received on terminal end 32e. In one aspect of the invention, first end 32f may include male threads configured to receive nut 36 thereon so as to secure agitator 34 on shaft 32. Opposing second end 32s is adapted to mount to spindle 30 such that rotation of spindle 30 causes rotation of shaft 32 and agitator 34.

An impeller 40 includes a central shaft receiving bore 42 configured to receive shaft 32 therethrough. Lower surface 40l of impeller 40 may be positioned proximate to, and slightly above (such as less that about 0.125 inches), top surface 24t of base plate 24 so as to enable free rotation of impeller 40 relative to top surface 24t. Shaft 32 may include a keyed surface which is configured to engage a corresponding key receiving feature defined along shaft receiving bore 42. The keyed connection may then allow impeller 40 to rotate as shaft 32 rotates upon powering of motor 28. Upper surface 40u of impeller 40 may also include a plurality of upwardly extending vanes 44. Vanes 44 may then assist dispersing any particular matter that lands upon upper surface 40u, as will be described in greater detail below.

Mounted atop impeller 40 is a shroud 50 having a top plate 52 and a partial sidewall 54 mounted onto top surface 24t of base plate 24. Partial sidewall 54 disposes top plate 52 a spaced distance above base plate 24 so as to define an impeller cavity 56 therebetween, with impeller 40 located within impeller cavity 56. As seen most clearly in FIG. 2, partial sidewall 54 encircles only a portion of impeller cavity 56 so as to define a discharge opening 58 through which particulate matter may be dispersed by impeller 40. In one aspect of the invention, partial sidewall 54 is oriented toward a user while spreader system 10 is worn such that discharge opening 58 points away from the user and particulate matter is directed outwardly from the user. To that end, top plate 52 defines a shroud opening 60 through which particulate matter may pass from hopper outlet 18 through shroud opening 60 to land upon impeller 40, whereby rotation of impeller 40 through powering of motor 28 causes the particulate matter to be expelled from impeller 40 and dispersed through discharge opening 58. In a further aspect of the present invention, shroud 50 may include one or more pairs of upwardly extending shoulder members 62 configured to receive a respective wing 63 formed on hopper 12 so as to secure hopper 12 to base assembly 14, such as through a bolt/nut pair 65 (FIG. 1).

Base assembly 14 may further include a gate opening 70 configured to mount between hopper outlet 18 and shroud 50 and includes a shaft bore 72 proportioned to allow passage of shaft 32 therethrough. As seen most clearly in FIG. 6, gate opening 70 further defines one or more flow restriction orifices 74 which may operate to assist metering of flow of the particulate material from hopper 12. To even further restrict material flow, base assembly 14 may also include a rotary gate 76 positioned below gate opening 70 and above shroud 50. Rotary gate 76 includes a gate plate 78 defining gate restriction openings 80 which are complementary to flow restriction orifices 74 within gate opening 70. Rotary gate 76 includes a gate lever 82 to assist rotation of rotary gate 76 relative to gate opening 70. Gate lever 82 may also include a detent 84 which may be selectively positioned within one of a plurality of slots 86 formed within shroud 50 between a fully open position, a fully closed position or one or more partially occluded positions.

Figure 6:
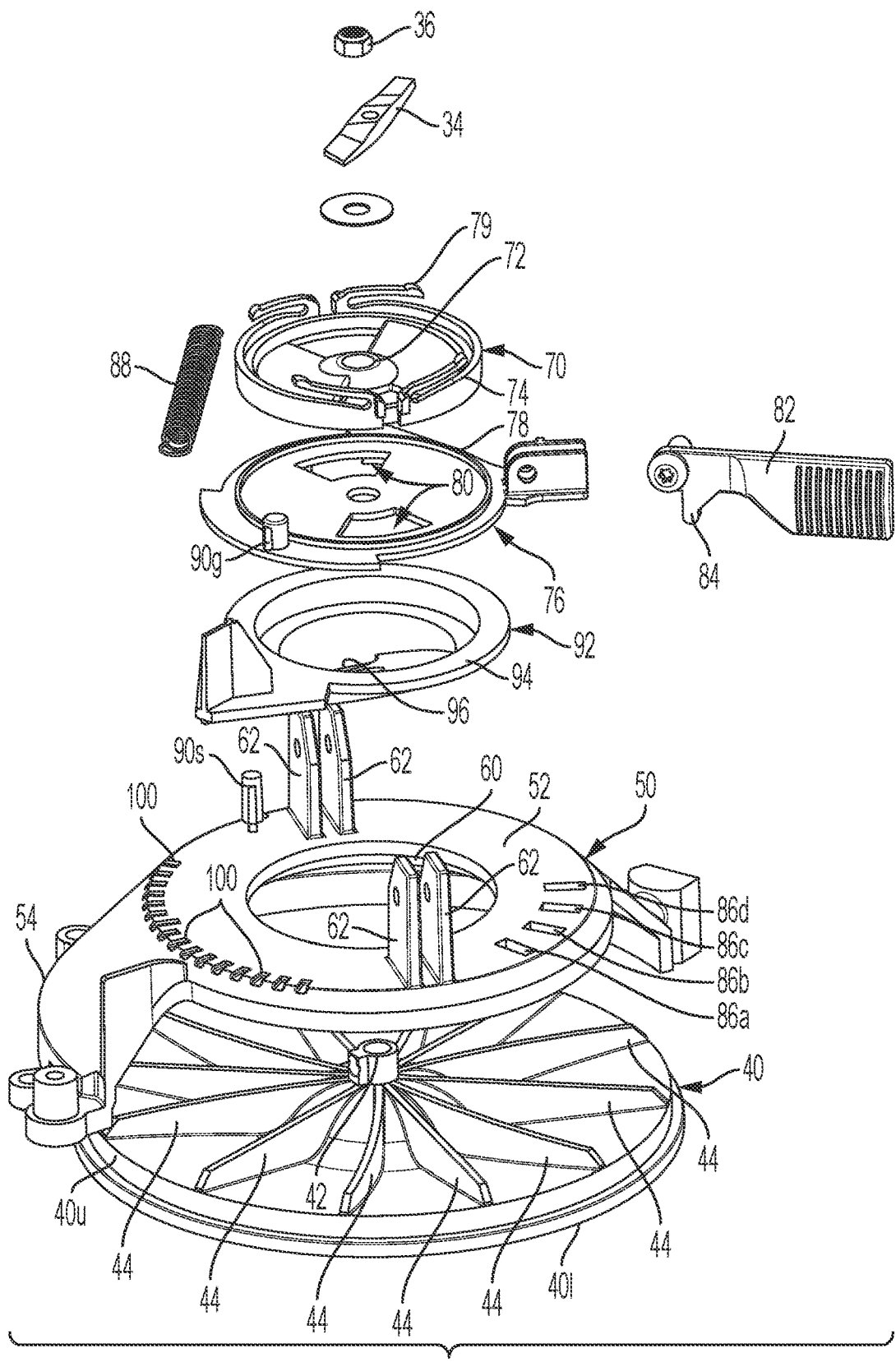
FIG. 6 is a partial exploded view of the exemplary embodiment of a base assembly shown in FIG. 3.
Figure 7:
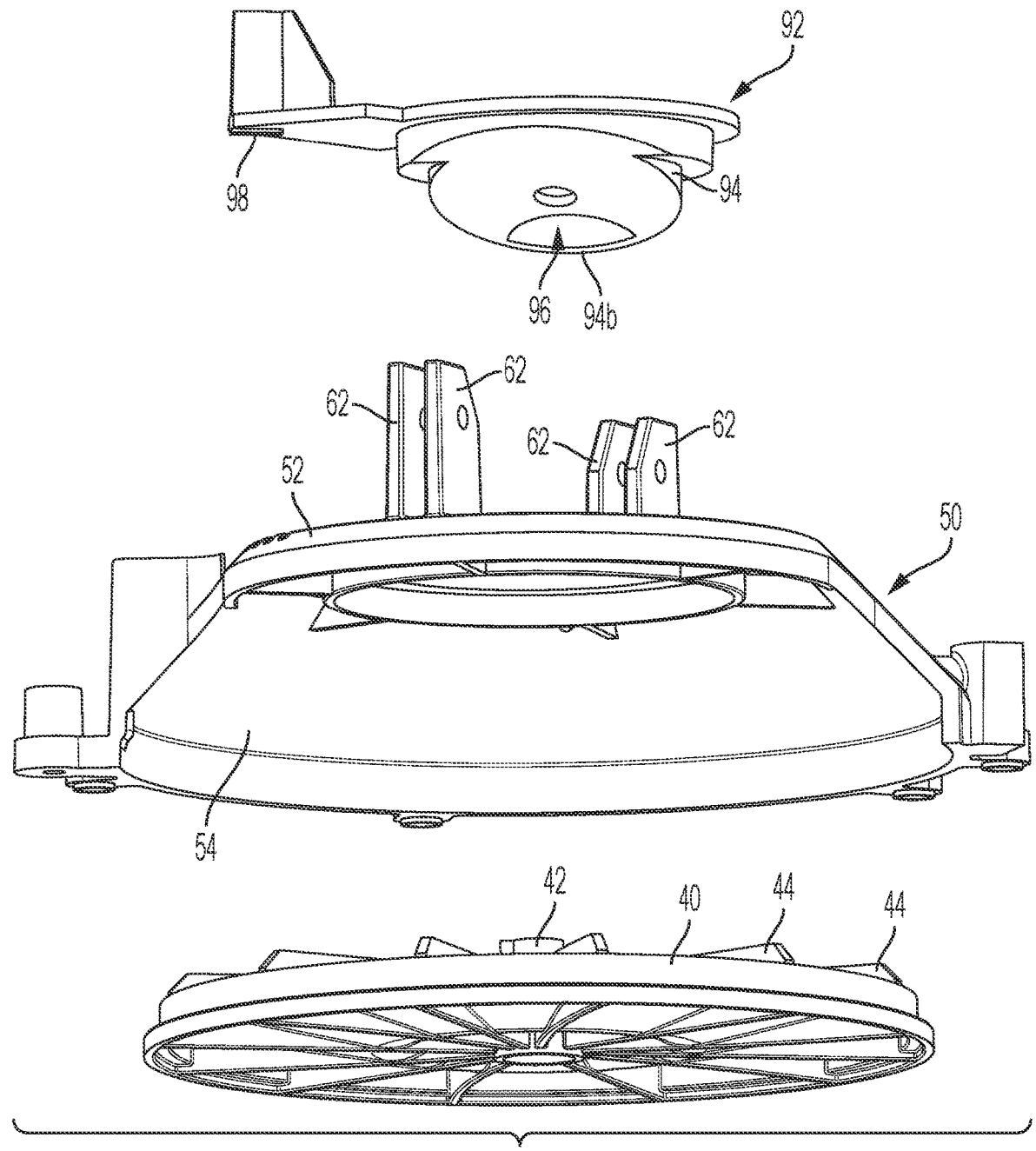
FIG. 7 is an expanded exploded view of an impeller, shroud and adjustable location spreader used within the exemplary embodiment of a base assembly shown in FIG. 3.
Figure 8:
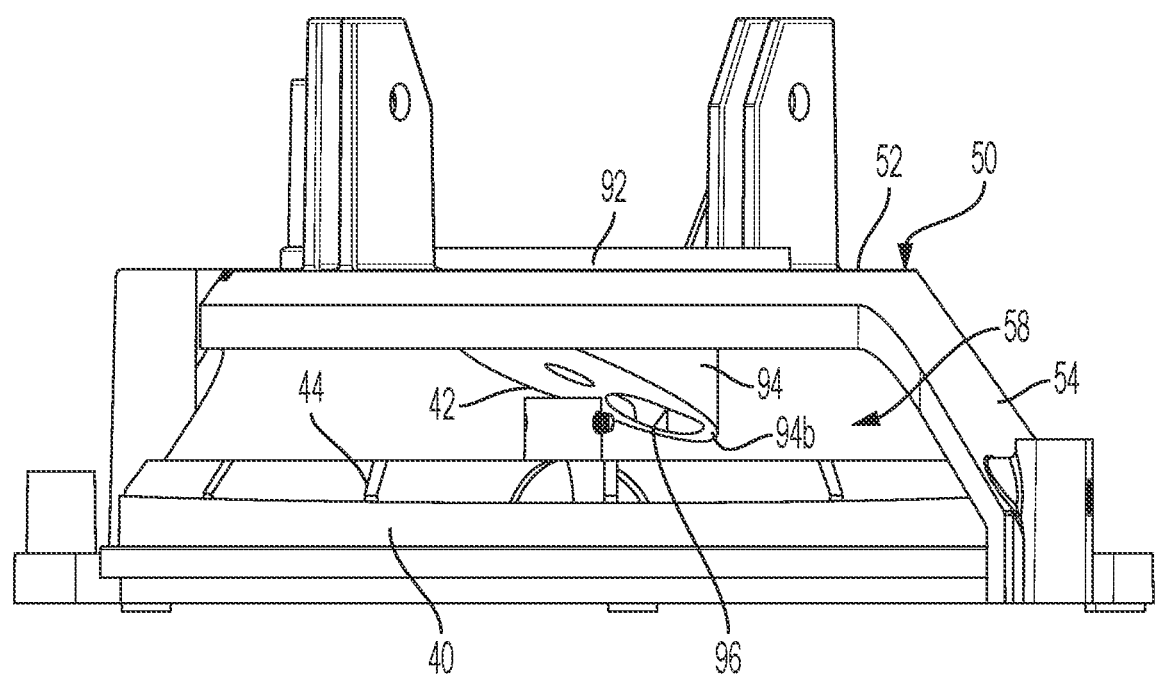
FIG. 8 is a side view of the impeller, shroud and adjustable location spreader shown in FIG. 7.

As shown in FIG. 6, and by way of example and without limitation thereto, shroud 50 may define four slots 86a, 86b, 86c, 86d to selectively orient gate restriction openings 80 relative to flow restriction orifices 74 in a fully closed orientation (slot 86a), mostly occluded orientation (slot 86b), slightly occluded orientation (slot 86c) and a fully open orientation (slot 86d). In this manner, a user may adjustably control the amount of particulate material which passes from hopper 12 to impeller 40. A gate spring 88 may be mounted onto respective spring posts 90s on shroud 50 and 90g on rotary gate 76 so as to bias rotary gate 76 toward the fully closed orientation. Gate spring 88 may thus ensure that rotary gate 76 will remain fully occluded when not actively engaged such that particulate material remaining within hopper 12 does not unwantedly fall to impeller 40.

In a further aspect of the present invention, base assembly 14 may also include an adjustable location spreader 92 located between rotary gate 76 and shroud 50. As seen most clearly in FIGS. 7 and 8, location spreader 92 includes a sloped bottom plate 94 defining a plate opening 96 therethrough. At least a portion of sloped bottom plate 94 extends through shroud opening 60 with plate opening 96 positioned proximate bottom 94b of bottom plate 94 such that plate opening 96 is located slightly above impeller 40. As a result, particulate material passing from hopper 12, through gate opening 70 and rotary gate 76 may be selectively loaded onto impeller 40 by rotatably positioning plate opening 96 relative to discharge opening 58. The relative positioning of plate opening 96 to impeller 40 may be indexed, such as via a tab 98 within a respective recess 100 (see also FIG. 6).

In this manner, the throw angle and distance of the particulate material may be selectively controlled by the user. That is, by positioning plate opening 96 relatively close to discharge opening 58, the amount of centripetal acceleration imparted to the particulate material by the rotating impeller 40 is relatively low such that the particulate material will spread within a relatively short arc and at a relatively short distance from the user. In contrast, should the plate opening 96 be placed further away from discharge opening, a greater amount of centripetal acceleration may be imparted to the particulate matter by the rotating impeller 40 such that the arc of spread and distance of particulate travel would be greater. Throw angle and distance may also be further selectively adjusted using speed control dial 33 to regulate the rotational speed of impeller 40. From the above discussion, one skilled in the art should recognize that spreader system 10 enables a user to control not only the amount of particulate matter dispersed by the impeller, but also the coverage area of the dispersed material.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A chest-mounted spreader system configured to disperse particulate material, the spreader system comprising:
    a) a hopper configured to receive the particulate material therein and defining a hopper outlet; and
    b) a base assembly adapted to mount said hopper thereon, said base assembly comprising:
        i) a base unit having a base plate having a top surface, a bottom surface and defining a spindle orifice therethrough;
        ii) an electric motor coupled to said bottom surface of said base plate, said electric motor including a spindle wherein said spindle passes through said spindle orifice;
        iii) a rotatable shaft, wherein a first end of said shaft extends into said hopper when said hopper is mounted on said plate and wherein a second end of said shaft engages said spindle;
        iv) an impeller mounted on said first end of said shaft and positioned proximate the top surface of said base plate;
        v) a shroud having a top plate defining a shroud opening therein and a partial sidewall, wherein said partial sidewall is affixed to said top surface of said base plate thereby defining an impeller cavity defined by said base plate, said top plate and said partial sidewall, wherein said impeller cavity includes a discharge opening opposite said partial sidewall, and wherein said impeller is received within said impeller cavity;
        vi) a gate opening located between said hopper outlet and said shroud, said gate opening proportioned to overlap said shroud opening, said gate opening defining one or more flow restriction orifices; and
        vii) a rotary gate mounted between said gate opening and said shroud opening defining one or more gate restriction openings therein, wherein said rotary gate is selectively positionable between a fully open position whereby said gate restriction openings fully coincide with said flow restriction orifices and a fully closed position whereby said gate restriction opening fully occludes said flow restriction orifices
    wherein said shroud opening is in fluid communication with said hopper outlet whereby said shroud is configured to pass the particulate matter from said hopper to said impeller while said electric motor is powered to thereby rotate said shaft and said impeller to disperse the particulate matter through said discharge opening.

2. The chest-mounted spreader system of claim 1 wherein the rotary gate is selectively positionable in a partially occluded position whereby the gate restriction openings partially overlap with said flow restriction orifices.

3. The chest-mounted spreader system of claim 2 wherein the rotary gate includes a gate lever configured to manually selectively control rotation of said rotary gate relative to said gate opening.

4. The chest-mounted spreader system of claim 3 wherein the gate lever includes a detent and said shroud defines a plurality of slots therein, wherein said detent is selectively positionable within a respective slot to releasably secure said rotary gate in said fully open position, said fully closed position or said partially occluded position.

5. The chest-mounted spreader system of claim 1 wherein the base assembly further includes:
    viii) an adjustable location spreader located between said rotary gate and said shroud, the location spreader having a sloped bottom plate defining a plate opening proximate the bottom of said slope.

6. The chest-mounted spreader system of claim 5 wherein at least a portion of said sloped bottom plate including said plate opening extends through said shroud opening of said shroud.

7. The chest-mounted spreader system of claim 5 wherein said first end of said rotatable shaft extends through a respective shaft bore within each of said impeller, said location spreader, said rotary gate and said gate opening wherein a terminal end of said first end of said rotatable shaft terminates above said gate opening.

8. The chest-mounted spreader system of claim 7 wherein the terminal end of said first end of said rotatable shaft includes an agitator affixed thereto.

9. The chest-mounted spreader system of claim 1 further including a battery mounted to said base assembly, said battery being electrically coupled to said electric motor.

10. The chest-mounted spreader system of claim 9 further including a potentiometer electrically coupled inline between said battery and said electric motor, said potentiometer selectively adjustable to control power to said electric motor to thereby selectively control speed of rotation of said rotatable shaft.

* * * * *